United States Patent Office 3,377,312
Patented Apr. 9, 1968

3,377,312
HEAT-STABILIZED SILOXANE ELASTOMERS
Ronald H. Baney, Midland, Mich., assignor to Dow Corning Corporation, Midland, Mich., a corporation of Michigan
No Drawing. Filed June 15, 1964, Ser. No. 375,379
12 Claims. (Cl. 260—37)

This application relates to the process of heat-stabilizing a curable siloxane elastomer stock comprising mixing therewith from 0.005 to 5 weight percent of iron chemically bound as ferric silanolate, based on the weight of the elastomer stock.

It has been found that the additives of this invention impart heat-stability to siloxane elastomers which is comparable with or superior to the best of the previously known additives when they are used in the same proportions as the ferric silanolates, and in the absence of the synergistic effects of carbon black, plasticizers, and other materials added to enhance the effect of known stabilizers.

Ferric silanolates exhibit their advantages best in standard peroxide-cured elastomer stocks when they are used in a proportion of 0.01 to 0.1 weight percent of chemically bound iron, based on the weight of the elastomer stock. No other known additive is so effective for so long a time as a heat-stabilizer at these small proportions.

Furthermore, the ferric silanolates of this invention are generally compatible and even soluble in siloxane elastomer stocks. Many of them therefore can be used to make clear, heat-stable elastomers.

Ferric silanolates are antioxidants. It is therefore very difficult to use them in proportions greater than 0.5 weight percent of chemically bound iron, based on the weight of the elastomer stock, when the elastomer stock is to be cured by an oxidative (e.g. peroxide) curing mechanism. Above that weight percent, inhibition of the cure of the elastomer will be a very serious matter.

Where an elastomer stock has a non-oxidative cure mechanism, however, the main limiting factor on the maximum amount of ferric silanolate that can be present is its effect on the strength of the cured elastomer stock. It is anticipated that about 5 weight percent of chemically bound iron in the form of ferric silanolate would be the maximum desirable amount.

Any curable siloxane elastomer stock known to the art can be used in this invention. They can contain fillers, plasticizers, and other additives. The literature is full of examples of such elastomer stocks. The additive of this invention is most effective, however, when a silica filler is present.

The ferric silanolates of this invention are defined to be compounds of the formula:

where R is a monovalent hydrocarbon or halohydrocarbon radical of less than 11 carbon atoms, and $n$ is a positive integer.

The ferric silanolates of this invention are of uncertain structural formula. They are believed by some to exist as associated compounds of the formula:

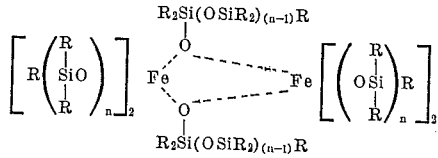

Any association compound which happens to be the actual configuration of ferric silanolate is intended to be covered by the claims of this application.

Ferric silanolates containing branched-chain siloxanes such as

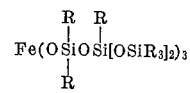

are also within the scope of this invention.

The above materials can be made by the following reaction:

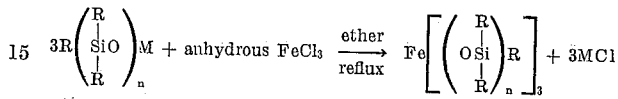

where M is sodium, lithium, or potassium. More extreme conditions may be needed for compounds with higher values of $n$. The reaction is most favorable when $n$ is 1. Information concerning this reaction can be found in an article by H. Schmidtbauer, Chemische Berichte 97, 836 (1964).

The ferric silanolates of this invention are also defined to be polymeric materials of indeterminate structure where ferric ions are bonded to R-substituted siloxane chains through FeOSi linkages, each siloxane chain being bonded to 1 or more ferric ions. Any such polymeric material is operative in this invention.

These materials can be made by reacting $(R_3SiO)_3Fe$ (made by the above process) with a polysiloxane which is substituted with R groups, defined above, and an average of greater than one silicon-bonded hydroxyl group per molecule. Simple heating will cause an exchange reaction of the following sort:

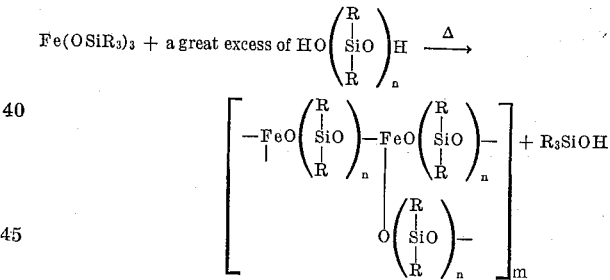

where $m$ is an integer of greater than 1.

This reaction seems to be an equilibrium, so if smaller amounts of

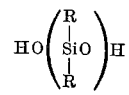

are used, larger amounts of

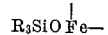

linkages will be found in the product.

It is, therefore, not possible to accurately characterize these compounds by their structural formula, as is the situation with all polymers, but it is known that the reaction proceeds between all hydroxylated siloxanes with R group substituents and compounds of the formula $Fe(OSiR_3)_3$ to produce materials which are suitable for use in this invention.

The analogous reaction product that is formed when siloxanes containing only one silicon-bonded OH group per molecule are used are also suitable for use in this invention.

R can be any monovalent hydrocarbon radical of less than 11 carbon atoms, e.g.; alkyl radicals such as methyl, ethyl, isopropyl, 2-ethylhexyl, and decyl; unsaturated aliphatic radicals such as vinyl, ethynyl, allyl, and 4-hexenyl; cycloaliphatic radicals such as cyclohexyl and cyclophentenyl; and aryl radicals such as phenyl, tolyl, benzyl, and naphthyl.

R can also be any monovalent halohydrocarbon radical of less than 11 carbon atoms, e.g.; haloalkyl radicals such as beta-chloroethyl, 3,3,3-trifluoropropyl, beta-(perfluorohexyl)ethyl, and 4-bromodecyl; unsaturated haloaliphatic radicals such as chlorovinyl, bromoethynyl, and 3-fluoroalkyl; cyclohaolaliphatic radicals such as chlorocyclohexyl and dibromocyclopentenyl; and haloaryl radicals such as chlorophenyl, β,β,β-trifluorotolyl, and bromozenyl.

If desired, the ferric silanolate can be applied to the filler of the elastomer stock by contacting the filler with an organic solvent (e.g. toluene) solution of ferric silanolate, and allowing the solvent to evaporate.

The treated filler is then mixed with the siloxane gum and the other ingredients of the elastomer stock in a conventional manner.

The following examples are illustrative only, and should not be construed as limiting the invention, which is properly delineated in the appended claims.

EXAMPLE 1

The following ten elastomer stocks were made from the ingredients shown in Table I and milled to uniform composition.

Samples of the cured stocks were heat-tested in accordance with Table II, the results being therein recorded.

The columns headed "D" indicate the durometer reading in absolute units; "T" indicates the tensile strength in pounds per square inch; "E" indicates the elongation at the break point as a percentage of the original, unelongated length; and "TS" indicates the tension set, as a percentage of the original length.

TABLE I

| Composition No. | Parts of dimethylpolysiloxane gum with 7.5K phenylmethlsiloxy units and 0.1K methylvinylsiloxy units (mol percent) | Parts of high surface area silica | Parts of high surface silica treated with an ether solution of Fe[OSi(CH₃)₃]₃ | Parts of hydroxy-endblocked dimethylpolysiloxane fluid | Parts of Fe[OSi(CH₃)₃]₃ in benzene (1.89 wt. percent Fe) | Parts tertiary butyl perbenzoate | Wt. percent Fe as ferric silanolate, based on the wt. of the entire composition |
|---|---|---|---|---|---|---|---|
| 1 | 100 | | 40 | 10 | | 0.5 | 0.135 |
| 2 | 100 | 20 | 20 | 10 | | 0.5 | 0.0688 |
| 3 | 100 | 30 | 10 | 10 | | 0.5 | 0.0350 |
| 4 | 100 | 40 | | 10 | 4.75 | 0.5 | 0.0613 |
| 5 | 100 | 40 | | 10 | 2.38 | 0.5 | 0.033 |
| 6 | 100 | 40 | | 10 | 1.19 | 0.5 | 0.0164 |
| 7 | 100 | 40 | | 10 | 0.60 | 0.5 | 0.0075 |
| 8 | 100 | 40 | | 10 | | 0.5 | 0 |
| 9 | 100 | 40 | (¹) | 10 | | 0.5 | 0 |
| 10 | 100 | 40 | (²) | 10 | | 0.5 | 0 |

¹ 1 pt. of mapico red (Fe₂O₃)₃   ² 3 pts. of ceric hdrate paste (50% ceric hydrate in dimethylpolysiloxane gum).

TABLE II

| Composition No. | Before testing | | | | 1 hr. at 150° C., 24 hrs. at 250° C. | | | | 4 hrs. at 250° C., 24 hrs. at 316° C. | | | | 4 hrs. at 250° C., 100 hrs. at 316° C. | | | |
|---|---|---|---|---|---|---|---|---|---|---|---|---|---|---|---|---|
| | D | T | E | TS | D | T | E | TS | D | T | E | TS | D | T | E | TS |
| 1 | 49 | 1,190 | 990 | 20 | 73 | 705 | 405 | 15 | 82 | 545 | 100 | 10 | Not tested | 570 | 110 | 12 |
| 2 | 54 | 1,175 | 545 | 8 | 64 | 1,060 | 400 | 9 | 68 | 640 | 240 | 11 | 78 | | | |
| 3 | 57 | 1,120 | 465 | | 66 | 790 | 295 | 5 | 71 | 635 | 285 | 11 | Not tested | 470 | 90 | 12 |
| 4 | 53 | 1,180 | 380 | 4 | 61 | 1,045 | 320 | 7 | 68 | 690 | 190 | 8 | 93 flexible | | | |
| 5 | 56 | 1,230 | 410 | 3 | 60 | 1,030 | 330 | 5 | 67 | 645 | 210 | 9 | | | | |
| 6 | 56 | 1,205 | 425 | 5 | 62 | 1,040 | 340 | 3 | 68 | 640 | 235 | 12 | ¹ 97 | | | |
| 7 | 56 | 1,230 | 450 | 5 | 63 | 1,090 | 350 | 7 | 87 | 460 | 50 | 8 | ² 100 | Brittle | | |
| 8 | 55 | 1,300 | 460 | 6 | 63 | 1,120 | 380 | 8 | Brittle | | | | | Brittle | | |
| 9 | 54 | 950 | 370 | 4 | 61 | 1,120 | 360 | 3 | 67 | 640 | 270 | 11 | ¹ 96 | | | |
| 10 | 60 | 1,135 | 390 | 2 | 68 | 1,080 | 355 | 3 | 78 | 425 | 90 | 10 | | Brittle | | |

¹ Slightly flexible.   ² Brittle.

EXAMPLE 2

When the following materials are added to the following siloxane elastomer stocks, heat-stable, curable elastomer stocks result:

| | Gms. of Material | Elastomer stock | Gms. chemically bound Fe | Additive |
|---|---|---|---|---|
| (a) | 100 | Dimethylpolysiloxane gum | 0.12 | $\text{Fe}\left[\text{OSi}(\text{C}_2\text{H}_5)(\text{C}_{10}\text{H}_{21})\text{—O—Si}(\text{C}_2\text{H}_5)_2(\text{C}_{10}\text{H}_{21})\right]_3$ |
| | 20 | SiO₂ filler. | | |
| | 1 | Tertiarybutyl peroxide. | | |
| (b) | 100 | $\text{H}\left[\text{OSi}(\text{CH}_3)_2\right]_{100}\left[\text{OSi}(\text{CH}_3)(\text{C}_6\text{H}_4\text{Cl})\right]_7\text{OH}$ | 0.012 | $\text{Fe}\left[\text{OSi}(\text{CH}_3)_2(\text{C}_6\text{H}_3\text{ClCH}_3)\right]_{5}]_3$ |
| | 10 | TiO₂ filler. | | |
| | 10 | SiO₂ filler. | | |
| | 1 | Dicumylperoxide. | | |

| Gms. of Material | Elastomer stock | Gms. chemically bound Fe | Additive |
|---|---|---|---|
| (c) 100 | $(CH_2=CH)\underset{CH_3}{\overset{CH_3}{Si}}\left[O\underset{CH_2\!-\!CH_2\!-\!CX_3}{\overset{CH_3}{Si}}\right]_{100}OSi(CH=CH_2)$ with $CH_3$ groups | 1 | $Fe\left[O\underset{CH_3}{\overset{CX_3\!-\!CH_2\!-\!CH_2}{SiCH_3}}\right]_3$ |
| 30 | $SiO_2$ filler. | | |
| 1 | Sulfur. | | |
| (d) 100 | $H\underset{CH_3}{\overset{CH_3}{Si}}\!-\!\left[O\underset{CH_3}{\overset{CH}{Si}}\right]_{100}\!-\!O\underset{CH_3}{\overset{CH_3}{SiN}}$ | 100 | The reaction product of 1 mole $Fe[OSi(CH_3)_3]_3$ and 2 moles $HO\left(\underset{CH_3}{\overset{CH_3}{SiO}}\right)_{50}\!\left(\underset{CH_3}{\overset{CH=CH_2}{SiO}}\right)_4\!H$ |
| 30 | ZnO filler. | | |
| 50 | $SiO_2$ filler. | | |
| 0.01 | Chloroplatinic acid. | | |
| (e) 100 | $(CH_3)_3SiO\left[O\underset{CH_3}{\overset{CH_3}{Si}}\!-\!\right]_{150}OSi(CH_3)_3$ | 100 | The reaction product of 1 mole $Fe[OSi(CH_3)_3]_3$ and 2 moles 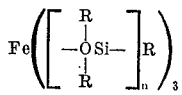 |
| 50 | $SiO_2$ filler. | | |
| 3 | Benzoyl peroxide. | | |
| (f) 100 | $(CH_3)_3SiO\left[\underset{CH_3}{\overset{CH_3}{SiO}}\right]_{100}\!\!\left[\underset{\phantom{C}}{\overset{CH_3}{SiO}}\right]_7\!Si(CH_3)_3$ with phenyl | ---------------- | $Fe\left[\left(\underset{CH_3}{\overset{CH_3}{OSi}}\right)_{20}\!\!\left(\underset{CH_3}{OSi}\right)\!-\!CH=CH_2\right]_3$ with phenyl |
| 25 | $SiO_2$ filler. | | |
| 2 | Dicumyl peroxide. | | |

That which is claimed is:

1. The process of heat-stabilizing a curable siloxane elastomer stock comprising mixing therewith from 0.005 to 5 weight percent of iron chemically bound as ferric silanolate of the formula:

$$Fe\left(\left[-O\underset{R}{\overset{R}{Si}}-\right]_n R\right)_3$$

where R is a monovalent hydrocarbon or halohydrocarbon radical of less than 11 carbon atoms, and "$n$" is a positive integer, based on the weight of the elastomer stock.

2. The process of heat-stabilizing a curable siloxane elastomer stock containing a peroxide curing catalyst comprising mixing therewith from 0.005 to 0.5 weight percent of iron chemically bound as ferric silanolate of the formula:

$$Fe\left(\left[-O\underset{R}{\overset{R}{Si}}-\right]_n R\right)_3$$

where R is a monovalent hydrocarbon or halohydrocarbon radical of less than 11 carbon atoms, and "$n$" is a positive integer, based on the weight of the elastomer stock.

3. The process of claim 1 where the stabilizing additive is $Fe[OSi(CH_3)_3]_3$.

4. The process of claim 2 where the stabilizing additive is $Fe[OSi(CH_3)_3]_3$.

5. A heat-stable siloxane elastomer stock consisting essentially of (a) curable siloxane elastomer stock plus, mixed therewith, from 0.005 to 5 weight percent of (b) iron chemically bound as ferric silanolate of the formula:

$$Fe\left(\left[-O\underset{R}{\overset{R}{Si}}-\right]_n R\right)_3$$

where R is a monovalent hydrocarbon or halohydrocarbon radical of less than 11 carbon atoms, and "$n$" is a positive integer, based on the weight of the elastomer stock.

6. A heat-stable siloxane elastomer stock consisting essentially of (a) a curable siloxane elastomer stock containing a peroxide curing catalyst plus, mixed therewith, from 0.005 to 0.5 weight percent of (b) iron chemically bound as ferric silanolate of the formula:

$$Fe\left(\left[-O\underset{R}{\overset{R}{Si}}-\right]_n R\right)_3$$

where R is a monovalent hydrocarbon or halohydrocarbon radical of less than 11 carbon atoms, and "n" is a positive integer, based on the weight of the elastomer stock.

7. The cured composition of claim 5.
8. The cured composition of claim 6.
9. The composition of claim 5 where the stabilizing additive is Fe[OSi(CH$_3$)$_3$]$_3$.
10. The composition of claim 6 where the stabilizing additive is Fe[OSi(CH$_3$)$_3$]$_3$.
11. The composition of claim 5 where a silica filler is present.
12. The composition of claim 6 where a silica filler is present.

References Cited

UNITED STATES PATENTS 2,803,617  8/1957  Corrin _____ 260—37

FOREIGN PATENTS 978,666  12/1964  Great Britain.

OTHER REFERENCES

K. A. Andrianov et al.: Vysokomol. soyed. 4: No. 5, 678–82, 1960.

JULIUS FROME, *Primary Examiner.*

JOHN E. CALLAGHAN, *Assistant Examiner*